US012811216B2

(12) United States Patent
Jeong et al.

(10) Patent No.: US 12,811,216 B2
(45) Date of Patent: Nov. 24, 2026

(54) BATTERY CASE AND BATTERY PACK INCLUDING THE SAME

(71) Applicant: SK ON CO., LTD., Seoul (KR)

(72) Inventors: Won Seok Jeong, Daejeon (KR); Hae Ryong Jeon, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/418,360

(22) Filed: Jan. 22, 2024

(65) Prior Publication Data

US 2024/0283052 A1 Aug. 22, 2024

(30) Foreign Application Priority Data

Feb. 22, 2023 (KR) ........................ 10-2023-0023705

(51) Int. Cl.

*H01M 10/6556* (2014.01)
*H01M 10/6554* (2014.01)
*H01M 10/6568* (2014.01)
*H01M 50/289* (2021.01)

(52) U.S. Cl.

CPC ... *H01M 10/6556* (2015.04); *H01M 10/6554* (2015.04); *H01M 10/6568* (2015.04); *H01M 50/289* (2021.01)

(58) Field of Classification Search

CPC ......... H01M 10/6568; H01M 10/6556; H01M 50/289

See application file for complete search history.

(56) References Cited

U.S. PATENT DOCUMENTS

| | | | | |
|---|---|---|---|---|
| 11,239,511 | B2 | 2/2022 | Jo et al. | |
| 11,450,913 | B2 | 9/2022 | Seo et al. | |
| 2009/0169978 | A1* | 7/2009 | Smith | H01M 50/358 429/82 |
| 2010/0136404 | A1* | 6/2010 | Hermann | H01M 50/24 429/120 |
| 2018/0277803 | A1* | 9/2018 | Park | H01M 50/553 |

(Continued)

FOREIGN PATENT DOCUMENTS

| | | | |
|---|---|---|---|
| CN | 210984839 U | 7/2020 | |
| CN | 211125725 U * | 7/2020 | A62C 3/16 |

(Continued)

OTHER PUBLICATIONS

CN-211125725-U translation (Year: 2019).*

(Continued)

*Primary Examiner* — Helen Oi K Conley
*Assistant Examiner* — Amanda Rosenbaum
(74) *Attorney, Agent, or Firm* — IP & T GROUP LLP

(57) ABSTRACT

A battery case according to the present disclosure includes a support panel provided to support a battery assembly; a spacing panel provided to face the support panel and forming an accommodating space for accommodating the battery assembly between the support panel and the spacing panel; a two-side panel provided to face each other to connect the support panel and the spacing panel to form a side surface of the accommodating space; a blocking panel disposed between the support panel and the spacing panel in parallel with the two-side panel to compart the accommodating space; and a cooling panel formed in the accommodating space in parallel with the blocking panel and cooling the battery assembly.

10 Claims, 8 Drawing Sheets

(56) References Cited

U.S. PATENT DOCUMENTS

| | | | | |
|---|---|---|---|---|
| 2020/0388805 | A1 | 12/2020 | Yoo et al. | |
| 2020/0395643 | A1 | 12/2020 | Seo et al. | |
| 2020/0398652 | A1* | 12/2020 | Stephens | B62D 25/025 |
| 2021/0328251 | A1* | 10/2021 | Zhao | H01M 10/613 |
| 2022/0336902 | A1 | 10/2022 | Park et al. | |
| 2023/0041540 | A1* | 2/2023 | Sun | H01M 50/10 |

FOREIGN PATENT DOCUMENTS

| | | | | |
|---|---|---|---|---|
| CN | 111293253 | B | 10/2020 | |
| KR | 10-2022-0064064 | A | 5/2022 | |
| KR | 10-2022-0100424 | A | 7/2022 | |
| KR | 10-2022-0165590 | A | 12/2022 | |
| KR | 10-2022-0165592 | A | 12/2022 | |
| WO | WO-2007047317 | A2 * | 4/2007 | H01M 10/4207 |

OTHER PUBLICATIONS

Extended European Search Report for European Patent Application No. 24154293.5 issued by the European Patent Office on Jul. 25, 2024.

* cited by examiner

BATTERY CASE AND BATTERY PACK INCLUDING THE SAME

CROSS-REFERENCE TO RELATED PATENT APPLICATION

The present application claims priority under 35 U.S.C. § 119(a) to Korean patent application number 10-2023-0023705 filed on Feb. 22, 2023, in the Korean Intellectual Property Office, the entire disclosure of which is incorporated by reference herein.

BACKGROUND OF THE INVENTION

1. Field

The present disclosure relates to a battery case and a battery pack including the same. Specifically, it relates to a battery case including a cooling panel and a blocking panel and a battery pack including the same.

2. Description of the Related Art

As an energy power source for driving various electronic devices such as smartphones, laptops, vehicles, and drones, demand for secondary batteries is rapidly increasing. In particular, as a secondary battery for driving a vehicle or the like, research on a battery module is actively conducted.

A secondary battery is a battery that is made to convert electrical energy into chemical energy and store it so that it may be reused multiple times through charging and discharging. Secondary batteries are widely used across industries due to their economical and eco-friendly characteristics. In particular, among secondary batteries, lithium secondary batteries are widely used throughout industries, including portable devices that require high-density energy.

The operating principle of lithium secondary batteries is an electrochemical oxidation-reduction reaction. In other words, the principle is that electricity is generated through the movement of lithium ions and charged in the reverse process. In the case of a lithium secondary battery, a phenomenon in which lithium ions in an anode escape therefrom and move to a cathode through an electrolyte and a separator is referred to as discharge. In addition, the opposite process of this phenomenon is referred to as charging.

Secondary batteries may generate a large amount of heat during charging and discharging processes. When the heat generated internally is not quickly extinguished, a fire may be propagated to adjacent battery cells and thereby cause a significant damage. Therefore, one of the main tasks is to quickly extinguish the heat generated inside a secondary battery and suppress fire propagation.

SUMMARY OF THE INVENTION

The problem that the present disclosure aims to solve is to increase energy density of a battery pack by comparting a space inside a battery pack through a cooling panel for cooling battery cells and a blocking panel for blocking fire propagation, instead of a comparting panel for comparting a battery pack.

In addition, another problem to solve is to continuously supply a fresh coolant that is capable of lowering the temperature of battery cells through a cooling panel.

In addition, another problem to solve is to improve the stability of a battery pack by preventing fire propagation through a blocking panel when a fire of a battery cell occurs.

In addition, the present disclosure can be widely applied in the field of electric vehicles and battery charging stations as well as green technology, such as solar power generation and wind power generation using batteries.

In addition, the present disclosure can be used in eco-friendly electric vehicles, hybrid vehicles, and others to prevent climate change by suppressing air pollution and greenhouse gas emissions.

To solve the problem described above, provided is a battery case including: a support panel provided to support a battery assembly; a spacing panel provided to face the support panel and forming an accommodating space for accommodating the battery assembly between the support panel and the spacing panel; a two-side panel provided to face each other to connect the support panel and the spacing panel to form a side surface of the accommodating space; a blocking panel disposed between the support panel and the spacing panel in parallel with the two-side panel to compart the accommodating space; and a cooling panel formed in the accommodating space in parallel with the blocking panel and cooling the battery assembly.

The blocking panel and the cooling panel may be disposed alternately.

The cooling panel and the blocking panel may be provided in plurality, and the plurality of blocking panels may be positioned between two cooling panels that are closest to the two-side panel among the plurality of cooling panels.

The blocking panel and the cooling panel may be disposed to be spaced apart from each other in a preset interval.

In addition, the battery case may further include an inlet through which a coolant flows in from the outside; an outlet through which the coolant is discharged to the outside; and a circulation flow path connecting the inlet and the outlet to circulate the coolant in communication with the outside.

In addition, the circulation flow path may include a cooling flow path included in the one or more cooling panels; an inlet flow path connecting the inlet and the cooling flow path; and an outlet flow path connecting the outlet and the cooling flow path.

Any one panel of the support panel or the spacing panel may include the inlet and the inlet flow path on one side, and the outlet and the outlet flow path may be provided on the other side of the any one panel.

Any one panel of the support panel and the spacing panel may include the inlet and the inlet flow path, and the other panel may include the outlet and the outlet flow path.

The cooling flow path may include one or more first cooling flow paths directed from one edge on one side of the cooling panel to another edge opposite to the edge.

The cooling flow path may further include a second cooling flow path connecting the one or more first cooling flow paths to each other.

The cooling flow path may be formed in a 'U' shape or a zigzag shape.

One edge on one side of the blocking panel may be connected to the support panel, and another edge on the other side of the blocking panel may be connected to the spacing panel.

The blocking panel may have a thermal conductivity of 0.3 W/m*K or less.

The thickness of the blocking panel may be thicker than the thickness of the cooling panel.

A battery pack according to the present disclosure includes: a plurality of battery assemblies; a support panel provided to support the plurality of battery assemblies; a spacing panel provided to face the support panel and forming an accommodating space to accommodate the plurality of battery assemblies between the support panel and the spacing panel; a two-side panel provided to face each other to connect the support panel and the spacing panel to form a side surface of the accommodating space; an opening portion formed by the support panel, the spacing panel, and the two-side panel; one or more blocking panels disposed between the support panel and the spacing panel in parallel with the two-side panel to compart the accommodating space; and one or more cooling panels formed in the accommodating space in parallel with the blocking panel and cooling the plurality of battery assemblies.

The battery assembly may be inserted into the accommodating space through the opening portion.

The plurality of battery assemblies may be grouped to form a plurality of battery stacks, and any one of the plurality of battery stacks may be formed by stacking along a direction in which the battery assembly is inserted through the opening portion.

The length of the blocking panel along the direction in which the battery assembly is inserted may be equal to or longer than the length of the battery stack.

According to an embodiment of the present disclosure, energy density of a battery pack can be increased by comparting a space inside a battery pack through a cooling panel for cooling battery cells and a blocking panel for blocking fire propagation, instead of a comparting panel for comparting a battery pack.

In addition, a fresh new coolant that can lower the temperature of a battery cell can be continuously supplied through a cooling panel.

In addition, when a fire occurs at a battery cell, fire propagation can be prevented through a blocking panel to improve the stability of a battery pack.

DETAILED DESCRIPTION

Figure 1:
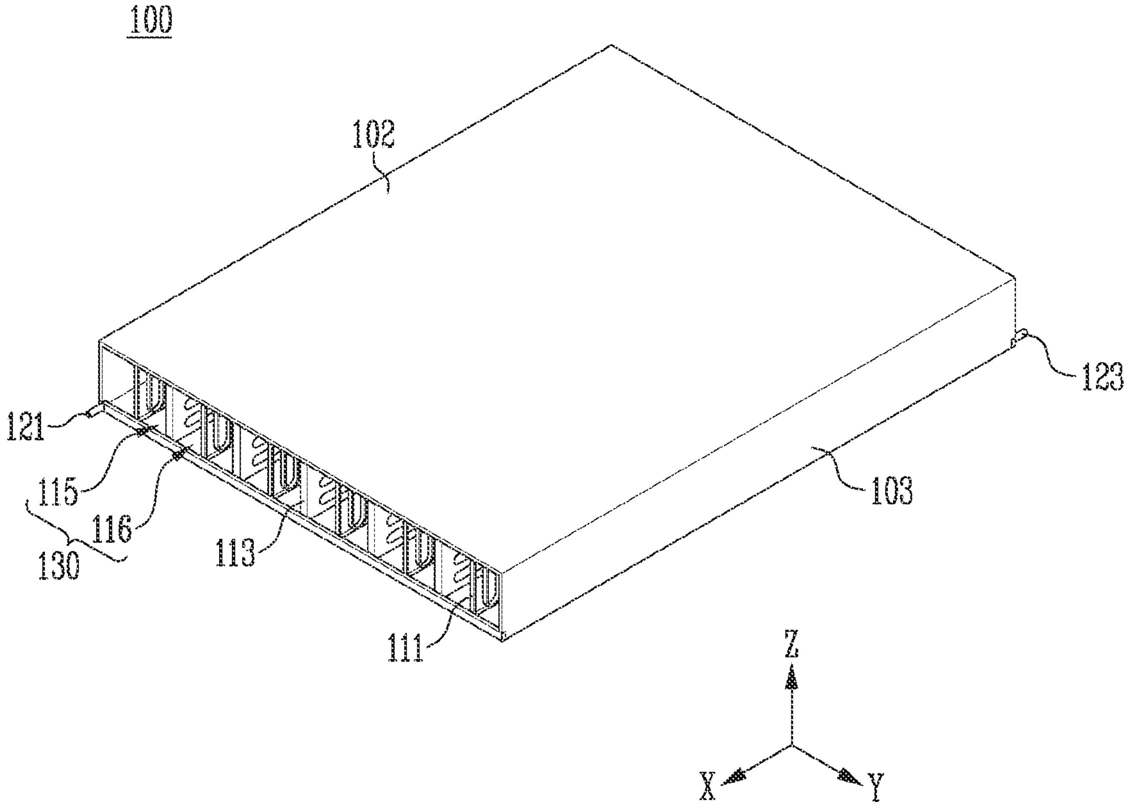
FIG. 1 shows an example of a battery case according to the present disclosure.

Hereinafter, preferred embodiments of the present disclosure will be described in detail with reference to the attached drawings. The configuration or control method of the device described below is only for explaining the embodiments of the present disclosure and is not intended to limit the scope of the present disclosure, and the same reference numerals used throughout the specification indicate the same components.

Specific terms used in this specification are merely for convenience of explanation and are not used to limit the illustrated embodiments.

For example, expressions such as "same" and "is the same" not only indicate a strictly identical state, but also indicate a state in which there is a difference in tolerance or the degree to which the same function is obtained.

For example, expressions representing relative or absolute arrangement such as "in a certain direction," "along a certain direction," "side by side," "perpendicularly," "at the center," "concentric," or "coaxial," not only strictly represent the arrangement, but also represent the state of relative displacement with a tolerance, or an angle or distance at which the same function is obtained.

To explain the present disclosure, it will be described below based on a spatial orthogonal coordinate system with X, Y, and Z axes orthogonal to each other. Each axis direction (X-axis direction, Y-axis direction, Z-axis direction) refers to both directions in which each axis extends.

The X-direction, Y-direction, and Z-direction mentioned below are for explanation so that the present disclosure may be clearly understood, and of course, the directions may be defined differently depending on where the reference is placed.

The use of terms such as 'first, second, and third' in front of the components mentioned below is only to avoid confusion about the components to which they are referred and is irrelevant to the order, importance, or master-slave relationship between the components, etc. For example, an invention that includes only a second component without a first component may also be implemented.

As used in this specification, singular expressions include plural expressions unless the context clearly dictates otherwise.

FIG. 1 shows an example of a battery case according to the present disclosure.

A battery cell described in this specification refers to a secondary battery that may be used repeatedly by charging and discharging electrical energy. For example, it may be a lithium secondary battery.

The main components of a battery cell are a cathode, an anode, a separator, and an electrolyte, and a battery cell may be made by putting the main components into a case (or pouch). A battery cell may further include electrode leads that protrude out of a case for electrical connection to the outside. Electrode leads may each be connected to a cathode and an anode of a battery cell.

Meanwhile, a battery module described in this specification refers to a grouping of one or more battery cells to protect the same against external shock, heat, vibration, or the like and allow the same to have high output and high capacity characteristics.

Meanwhile, battery assemblies 1, 10 described in this specification may refer to battery cells or battery modules.

Referring to FIG. 1, the battery case according to the present disclosure includes: a support panel 101 provided to support a battery assembly 1, 10 (FIGS. 2 and 3); a spacing panel 102 provided to face the support panel 101 and forming an accommodating space 130 for accommodating the battery assembly 1, 10 between the support panel 101 and the spacing panel; a two-side panel 103 provided to face each other to connect the support panel 101 and the spacing panel 102 to form a side surface of the accommodating space 130; a blocking panel 113 disposed between the support panel 101 and the spacing panel 102 in parallel with the two-side panel 103 to compart the accommodating space 130; and a cooling panel 111 formed in the accommodating space 130 in parallel with the blocking panel 113 and cooling the battery assembly 1, 10.

Figure 2:
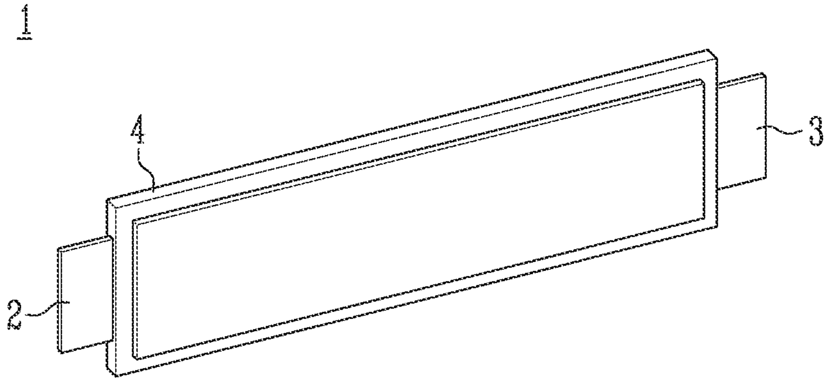
FIG. 2 shows a battery cell according to the present disclosure.

FIG. 2 shows a battery cell 1 according to the present disclosure.

The battery cell 1 may be classified into a pouch-type secondary battery, a prismatic secondary battery, or a cylindrical secondary battery according to the shape. In this specification, a pouch-type secondary battery is illustrated as an example for convenience of explanation, but it is not limited thereto.

The battery cell 1 may include an electrode assembly (not shown) and a pouch 4 for accommodating an electrode assembly. An electrode assembly may include a cathode, an anode, and a separator. A cathode may include a positive electrode active material, and an anode may include a negative electrode active material which lithium (Li) ions generated from a positive electrode active material may be inserted to and extracted from. In addition, a cathode and an anode may each further include a binder and a conductive material to improve mechanical stability and electrical conductivity. A separator may be provided to prevent electrical short-circuit between a cathode and an anode and to generate a flow of ions. The type of separator is not particularly limited, but may include a porous polymer film. An electrode assembly may be manufactured by stacking a plurality of cathodes and anodes alternately and interposing a separator between a cathode and an anode by a stacking, or zigzag stacking, or winding method.

A pouch 4 may accommodate an electrode assembly therein. A pouch 4 may include a sealing portion (not shown) blocking the inside and outside of a pouch 4. A sealing portion (not shown) includes a first sealing portion (not shown) and a second sealing portion (not shown), and an electrode lead 2, 3 that electrically connects an electrode assembly to the outside may be interposed between a first sealing portion and a second sealing portion. A electrode lead 2, 3 may include a cathode lead and an anode lead. A cathode lead and an anode lead may be disposed in parallel on a same one side of a pouch 4. Alternatively, a cathode lead and an anode lead may be disposed on one side of a pouch 4 and the other side opposite to the one side, respectively.

Figure 3:
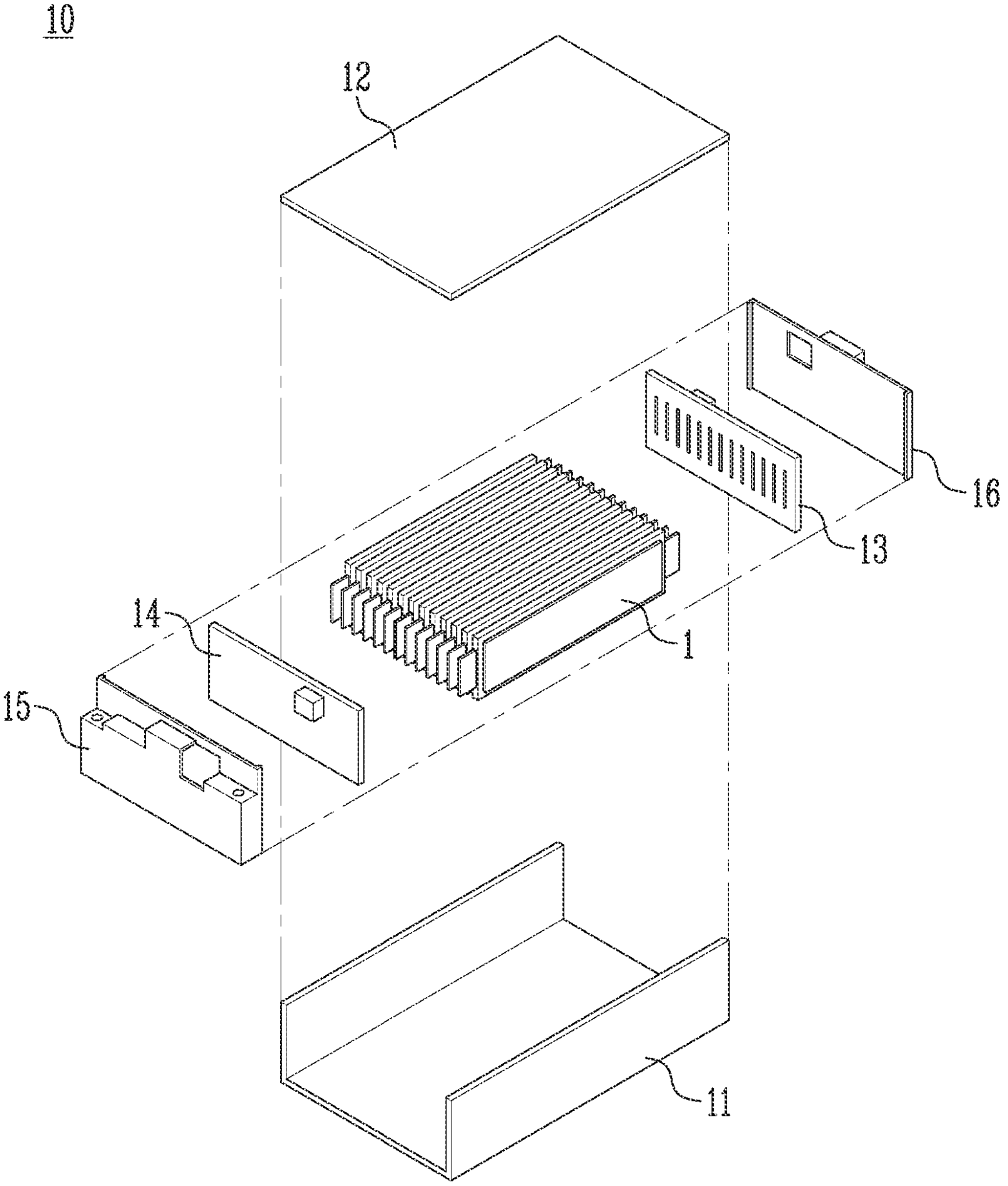
FIG. 3 shows a battery module according to the present disclosure.

FIG. 3 shows a battery module 10 according to the present disclosure.

Referring to FIG. 3, a battery module 10 may include module cases 11, 12 accommodating a plurality of battery cells 1. A plurality of battery cells 1 may be stacked along one direction. A plurality of battery cells 1 may be stacked in one direction to form a cell assembly. A cell assembly may be accommodated inside a module case. A module case may include a lower case 11 supporting a battery cell 1; and an upper case 12 connected to a lower case 11. A lower case 11 and an upper case 12 may be connected to form an accommodating space 130 therein.

A battery module 10 may further include a bus bar assembly 13, 14 that electrically connects a plurality of battery cells 1. A bus bar assembly 13, 14 may include a bus bar provided with a slit into which a battery cell 1 is inserted; and an electrode terminal for connecting a bus bar to the outside. An electrode terminal may be positioned outside a module cover 15, 16, which will be described later.

A battery module 10 may further include a module cover 15, 16. A module cover 15, 16 may be connected to a module case 11, 12 to accommodate a battery cell 1. Ultimately, a battery module 10 may have a rectangular parallelepiped shape formed by connecting a module case 11, 12 and a module cover 15, 16.

Figure 4:
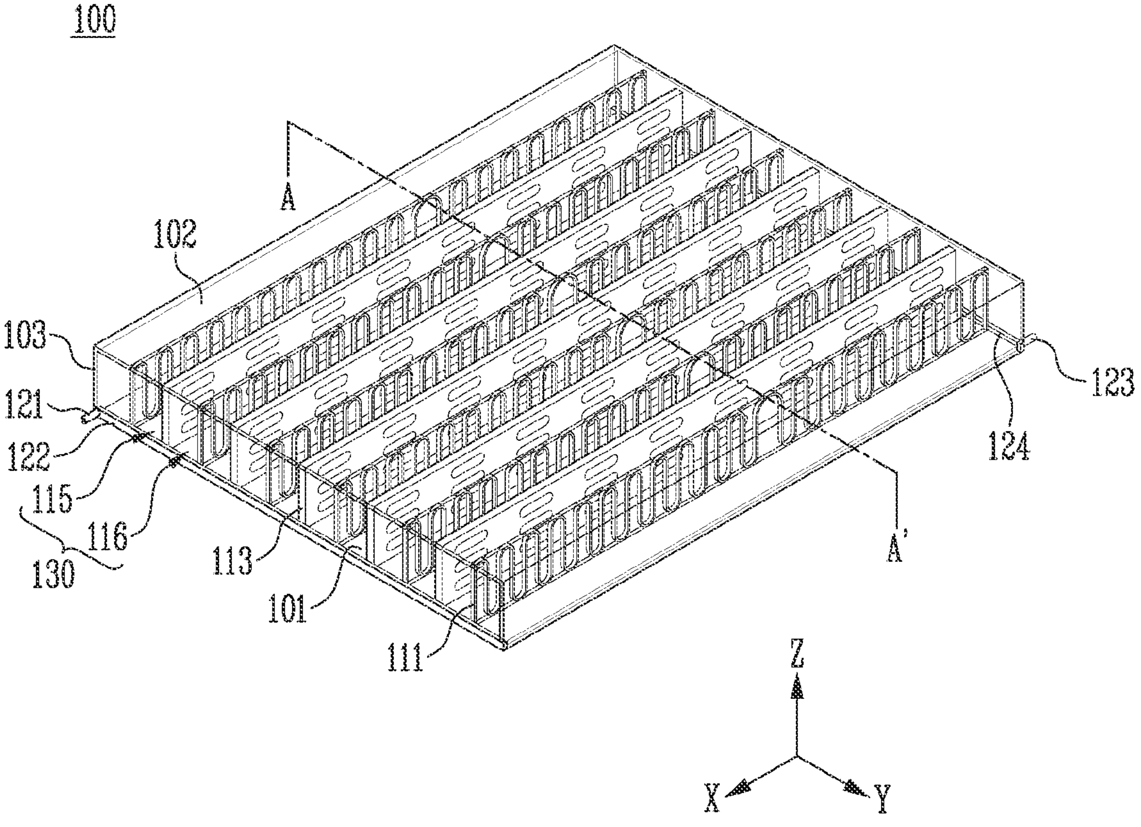
FIG. 4 shows a perspective view of a battery case according to the present disclosure.
Figure 5:
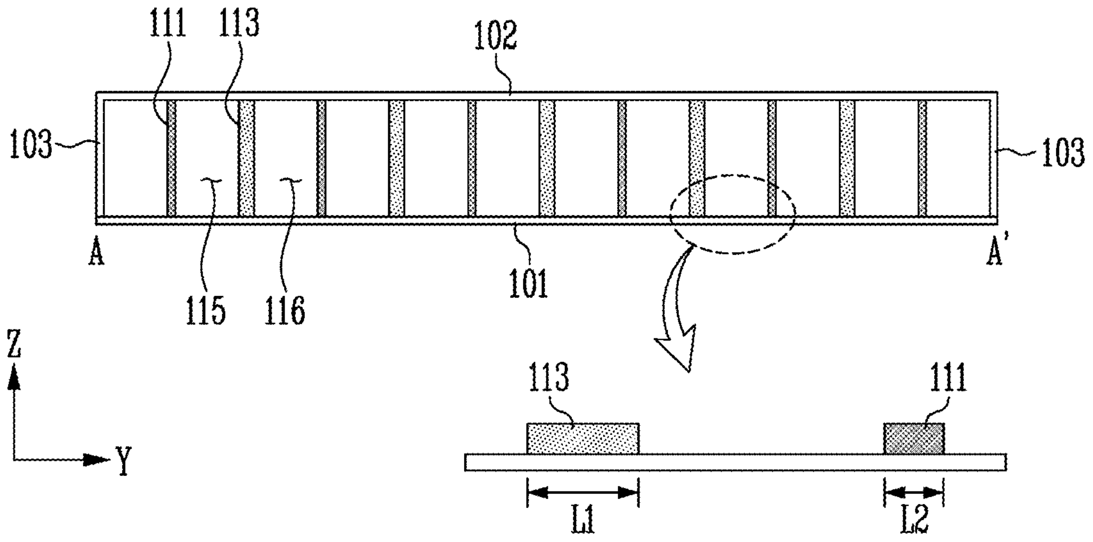
FIG. 5 shows a cross-section of a battery case along line A-A' of FIG. 4.
Figure 6:
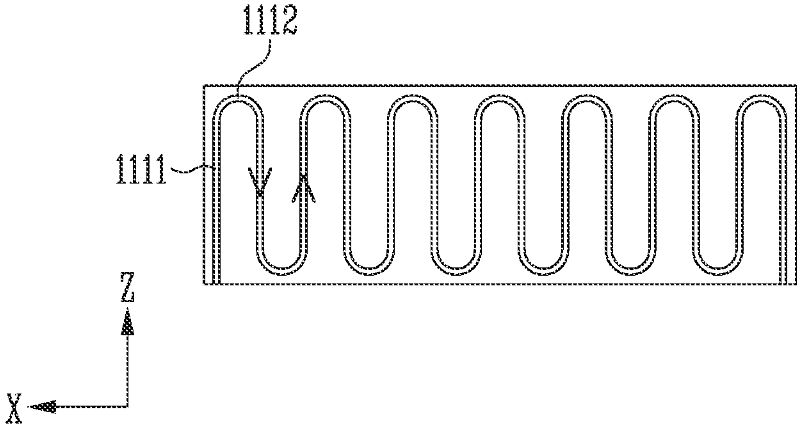
FIG. 6 shows a cooling panel according to the present disclosure.
Figure 7:
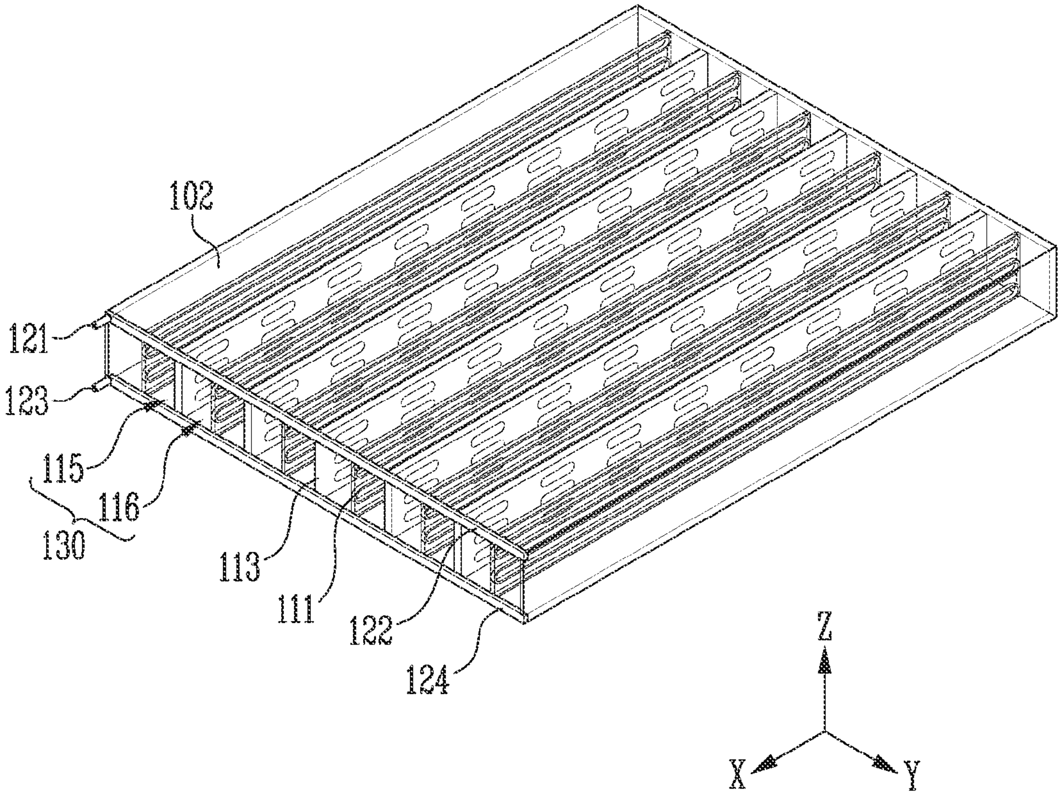
FIG. 7 shows a battery case according to another embodiment of the present disclosure.

FIG. 4 shows a perspective view of a battery case 100 according to the present disclosure; FIG. 5 shows a cross-section of a battery case 100 along line A-A' of FIG. 4; FIG. 6 shows a cooling panel 111 according to the present disclosure; and FIG. 7 shows a battery case 100 according to another embodiment of the present disclosure.

Referring to FIG. 4, a battery case 100 may include a support panel 101 for supporting a battery assembly 1, 10. A battery assembly 1, 10 may be positioned on a support panel 101. A battery assembly 1, 10 may be may be fixed on a support panel 101. To this end, a support panel 101 may further include a fixing groove (not shown) for fixing a battery assembly 1, 10. A portion of a battery assembly 1, 10 may be inserted into a fixing groove. A support panel 101 may be provided in a plate shape. Through this, a battery cell 1 may be stably supported inside a battery case 100.

A spacing panel 102 may be provided to face a support panel 101. An accommodating space 130 may be formed between a support panel 101 and a spacing panel 102. A battery assembly 1, 10 may be accommodated in an accommodating space 130. For example, battery cells may be sequentially stacked in an accommodating space 130. Battery cells may be sequentially stacked in an accommodating space 130 to form a cell assembly. An accommodation space 130 may be comparted into a plurality of spaces through a blocking panel 113 or a cooling panel 111, which will be described later.

A spacing panel 102 may preferably be spaced apart from a support panel 101 according to a preset distance to accommodate a battery assembly 1, 10. A preset distance may be set according to the specifications of a battery assembly 1, 10 positioned an accommodating space 130.

A spacing panel 102 may be provided parallel to the support panel 101. A spacing panel 102 may have the same shape as a support panel 101. For example, a battery case 100 may have a rectangular parallelepiped shape. Because of this, any one battery case 100 may be easily stacked with another battery case 100.

A two-side panel 103 may connect a support panel 101 and a spacing panel 102. A two-side panel 103 may form a side surface of an accommodating space 130. A two-side panel 103 may connect one edge of a support panel 101 and one edge of a spacing panel 102. A two-side panel 103 may be provided to face each other. Ultimately, a battery case 100 may have a hexahedral shape in which a support panel 101, a spacing panel 102, and a two-side panel 103 are connected and open to one side and the other side opposite thereto. A two-side panel 103 may be formed integrally with a support panel 101 or a spacing panel 102 depending on the manufacturing method.

Meanwhile, to increase stacking efficiency of battery assemblies 1, 10, it is necessary to compart the inside of a battery case 100. To this end, a comparting panel inside a battery case 100 may preferably be disposed along a horizontal or vertical direction so that battery assemblies 1, 10 may be sequentially stacked.

However, a comparting panel may increase the weight of a battery pack and occupy a space without performing a separate function, thereby reducing energy density of a battery pack. In particular, in a cell-to-pack structure where a battery pack is made by grouping battery cells, increasing the space efficiency of a battery pack and reducing the weight of a battery pack are very important issues.

To this end, in a battery case 100 described in the present disclosure, a cooling panel 111 including a coolant and a blocking panel 113 preventing fire propagation may be used for use in comparting the inside. In addition, in a battery case 100 of the present disclosure, the structure in which a cooling panel 111 and a blocking panel 113 are disposed, for example, the arrangement order or number thereof, may be changed to enhance cooling performance or fire propagation suppression function.

For example, when a battery case 100 includes multiple cooling panels, the cooling performance of the battery case 100 may be improved. Alternatively, when a battery case 100 includes a plurality of blocking panels 113, fire propagation in the battery case 100 may be prevented and thus the stability of the battery pack including the same may be improved.

Referring to FIG. 4, a blocking panel 113 is disposed between a support panel 101 and a spacing panel 102 in parallel with a two-side panel 103. As described above, a blocking panel 113 may compart an accommodating space 130. An accommodating space 130 may be comparted by a blocking panel to include a first accommodating space 115 and a second accommodating space 116. Without being limited thereto, an accommodating space 130 may be comparted by a blocking panel to be comparted into more low-level accommodating spaces 130.

Movement of a battery assembly 1, 10 may be blocked between two accommodating spaces 130 formed by being comparted by a blocking panel 113. In addition, a path between two spaces may be blocked by a blocking panel 113 so that fire propagation may be suppressed.

Referring to FIG. 4, fire propagation within an accommodating space 130 from a first accommodating space 115 to a second accommodating space 116 may be suppressed. As a result, even when a fire occurs at a battery assembly 1, 10 included in a first accommodating space 115, the fire will not be propagated to a second accommodating space 116.

To block a first accommodating space 115 and a second accommodating space 116, one edge of a blocking panel 113 may be connected to a support panel 101, and another edge on the other side of the blocking panel 113 may connected to a spacing panel 102. Referring to FIG. 4, the length of a blocking panel 113 along the X-direction may be longer than the length of a support panel 101 and a spacing panel 102. The length of one edge on one side of a blocking panel 113 and the length of another edge on the other side of the blocking panel 113 may preferably be the same as the length of a support panel 101. As a result, two spaces comparted by a blocking panel 113 will be completely blocked.

Preferably, a blocking panel 113 may have a thermal conductivity of 0.3 W/m*K or less. As a result, the heat mutually transferred between accommodating spaces 130 comparted by a blocking panel 113 may be minimized. In addition, fire propagation may be suppressed.

A cooling panel 111 may be formed in an accommodating space 130 in parallel with a blocking panel 113. A cooling panel 111 may be formed between a support panel 101 and a spacing panel 102. A cooling panel 111 may be disposed adjacently to a battery assembly 1, 10 to cool a battery assembly 1, 10.

Referring to FIG. 4, the length of a cooling panel 111 along the X-direction may be longer than the length of a support panel 101 and a spacing panel 102. Battery assemblies 1, 10 may be sequentially stacked along the X-direction. For example, stacking may be performed in a direction in which a wider surface among surfaces of a battery cell faces a cooling panel. As a result, the contact area between a battery cell and a cooling panel increases, thereby improving cooling efficiency. In addition, since a cooling panel extends along the X-direction, each of battery assemblies 1, 10 stacked along the X-direction may be cooled.

A cooling panel 111 may also compart an accommodating space 130. Two an accommodating spaces 130 comparted by a cooling panel 111 may each accommodate a battery assemblies 1, 10. Due to a cooling panel 111, an accommodating space 130 may be comparted into a third accommodating space (not shown) and a fourth accommodating space (not shown).

A blocking panel 113 and a cooling panel 111 may be disposed alternately. In addition, a blocking panel and a cooling panel may be arranged in parallel along one direction.

Referring to FIG. 4, a blocking panel 113 and a cooling panel 111 may be alternately disposed along the Y-direction. Cooling panels 111 may be alternately disposed so that a battery assembly 1, 10 included in each accommodating space 130 may come into contact with a cooling panel 111. Through this, each battery assembly 1, 10 may be cooled simultaneously. In addition, even when a fire occurs in any one battery assembly 1, 10, the fire may not be propagated beyond a blocking panel 113. For example, even when a fire occurs in a battery assembly 1, 10 accommodated in a first accommodating space 115, the fire may not be propagated to a battery assembly 1, 10 accommodated in a second accommodating space 116. Therefore, a battery assembly 1, 10 may be cooled without a fire propagated from any one accommodating space 130 of which two sides are formed with blocking panels to an adjacent accommodating space 130.

A blocking panel 113 and a cooling panel 111 may be disposed to be spaced apart in a preset interval. An accommodation space 130 may be formed as they are spreading in a preset interval. A preset interval may be changed depending on the specifications of a battery assembly 1, 10. When a blocking panel 113 and a cooling panel 111 are alternately arranged, all intervals between a blocking panel 113 and a cooling panels 111 may be the same. Because of this, the load of a spacing panel 102 may be evenly transmitted through a blocking panel 113 or a cooling panel 111. Alternatively, even when other battery cases are stacked on a spacing panel of a battery case, the pressure may be evenly distributed so that the structural stability of the battery case may be maintained.

A plurality of blocking panels 113 and cooling panels 111 may be provided, and a plurality of blocking panels 113 may be positioned between two cooling panels 111 that are closest to a two-side panel 103 among a plurality of cooling panels 111. That is, among a blocking panel 113 and a cooling panel 111, the one positioned closer to a two-side panel 103 may be a cooling panel 111.

When a panel adjacent to a side panel is a blocking panel 113, a battery assembly 1, 10 may be disposed in a space formed between a blocking panel 113 and a side panel. In this space, a battery assembly 1, 10 may come into contact with a cooling panel 111 and so a battery assembly 1, 10 may not be cooled. Because of this, a fire at a battery assembly 1, 10 may occur. Therefore, a panel that is closest to a side panel may preferably be a cooling panel 111.

The thickness of a blocking panel 113 may be thicker than the thickness of a cooling panel 111. Referring to FIG. 5, the thickness of a blocking panel 113 may refer to the length of a blocking panel 113 formed along the Y-direction. The thickness of a cooling panel 111 may refer to the thickness of a cooling panel 111 formed along the Y-direction. A blocking panel 113 may be formed to be thicker than a cooling panel 111 to improve the possibility of preventing fire propagation of a battery assembly 1, 10 and increase the stability of a battery case 100.

A battery case may further include an inlet 121 through which a coolant flows in from the outside; an outlet 123 through which a coolant is discharged to the outside; and a circulation flow path connecting an inlet 121 and an outlet 123. A circulation flow path may be a path through which a coolant moves inside a battery case.

A coolant may regulate the temperature of a battery assembly 1, 10 by circulating inside and outside a battery case. Ultimately, a coolant may flow in through an inlet 121 and be discharged through an outlet 123 via a circulation flow path.

One area of an inlet 121 and an outlet 123 may be open for a coolant to move. An inlet 121 and an outlet 123 may be in the shape of a hole. An inlet 121 and an outlet 123 may have a structure protruding outward from one side of a battery case. Alternatively, it may be a structure penetrated from one side of a battery case to the inside. An inlet 121 and an outlet 123 are not limited thereto as long as they have a shape that allows a coolant to move. Through an inlet 121 and an outlet 123, a coolant may move from the inside of a battery case to the outside or in the opposite direction. An inlet 121 and an outlet 123 may be connected to a supply device supplying a coolant to a battery case. A power device may be provided outside a battery case. Through a power device, a coolant may move from an inlet 121 to an outlet 123 and circulate in a circulation flow path. A power unit may be a pump or motor. A coolant discharged through an outlet may be cooled through a heat exchanger (not shown) positioned on a circulation flow path and then supplied again through an inlet.

A circulation flow path may include a cooling flow path, an inlet flow path 122, and an outlet flow path 124 included in one or more cooling panels 111. An inlet flow path 122 may connect an inlet 121 and a cooling flow path. An outlet flow path 124 may connect an outlet 123 and a cooling flow path. A cooling flow path may move a coolant through a cooling panel 111. A cooling panel 111 may maintain a low temperature due to a coolant. Heat may be transferred between a cooling panel 111 and a battery assembly 1, 10 through contact. To this end, a cooling panel 111 may include a material with high thermal conductivity.

An inlet flow path 122 may connect an inlet 121 and a cooling flow path. To this end, one end of a cooling flow path may be connected to an inlet flow path 122. An inlet flow path 122 may each be connected to a plurality of cooling flow paths.

An outlet flow path 124 may be further included so that a coolant that has moved through a cooling panel 111 may flow to the outside. An outlet flow path 124 may connect an outlet 123 and a cooling flow path. To this end, the other end of a cooling flow path may be connected to an outlet flow path 124. An outlet flow path 124 may each be connected to a plurality of cooling flow paths.

In addition, a plurality of cooling flow paths may further include fins protruding outwards or inwards in the shape of a pipe. In contrast, a cooling panel itself may form one channel and may further include fins, such as wavy fins, to improve thermal conductivity inside the channel. In other words, a cooling flow path may be modified in various ways to improve cooling performance.

An inlet 121 should be connected to an inlet flow path 122, and an outlet 123 should be connected to an outlet flow path 124 to allow a coolant to move. Therefore, an inlet 121 and an inlet flow path 122 may be provided on a same side of a battery case 100, and an outlet 123 and an outlet flow path 124 may be provided on a same side of a battery case 100.

Any one panel of a support panel 101 or a spacing panel 102 may include an inlet 121 and an inlet flow path 122 on one side and may include an outlet 123 and an outlet flow path 124 on the other side of the any one panel. That is, a support panel 101 may include all of an inlet 121, an inlet flow path 122, an outlet 123, and an outlet flow path 124. Alternatively, a spacing panel 102 may include all of an inlet 121, an inlet flow path 122, an outlet 123, and an outlet flow path 124. At this time, a side provided with an inlet 121 and an inlet flow path 122 to penetrate a cooling panel 111 and a side provided with an outlet 123 and an outlet flow path 124 may be opposing sides.

Referring to FIG. 4, an inlet 121 may be provided on one side of a support panel 101, and an outlet 123 may be provided on the other side of the support panel 101. An inlet flow path 122 may be provided along the Y-direction on one side of a support panel 101 provided with an inlet 121 and may each be connected to a plurality of cooling flow paths. An outlet 123 may be provided on the other side of the support panel 101, and an outlet flow path 124 may be provided along the Y-direction. An outlet flow path 124 may also each be connected to a plurality of cooling flow paths.

An inlet 121 and an outlet 123 may be positioned on different panels. Any one panel of a support panel 101 or a spacing panel 102 may include an inlet 121 and an inlet flow path 122, and the other one panel may include an outlet 123 and an outlet flow path 124. Referring to FIG. 7, a spacing panel 102 may include an inlet 121 and an inlet flow path 122, and a support panel 101 may include an outlet 123 and an outlet flow path 124. A coolant is supplied from above and flows downwards through this structure, allowing efficient circulation.

Without being limited thereto, a support panel 101 may include an inlet 121 and an inlet flow path 122, and a spacing panel 102 may include an outlet 123 and an outlet flow path 124. When an inlet 121 is supplied at a height lower than an outlet 123, a power device capable of circulating a coolant will need to be further included.

The pathway of a cooling flow path may be changed depending on the positions where an inlet 121 and an inlet flow path 122 and an outlet 123 and an outlet flow path 124 are formed.

A cooling flow path may include one or more first cooling flow path 1111 directed from one edge of a cooling panel 111 to another edge opposite the one edge. Referring to FIG. 4, one edge of a cooling panel 111 may be an edge in contact with a support panel 101, and the other edge may refer to an edge in contact with a spacing panel 102. That is, a first cooling flow path 1111 may be formed to extend along the Z-direction.

In addition, referring to FIG. 7, one edge of a cooling panel 111 may be an edge that does not contact with a support panel 101 and a spacing panel 102. That is, a first cooling flow path 1111 may be formed to extend along the X-direction. Without being limited thereto, a first cooling flow path 1111 directed from one edge to the other edge may not extend in parallel with the X-direction and the Z-direction but may be formed to be inclined. In this way, a first cooling flow path 1111 may be formed to be directed from one edge of a cooling panel 111 to the other edge so that the overall temperature of a cooling panel 111 may be lowered. A plurality of first cooling flow paths 1111 may be disposed in a same interval. As a result, the efficiency of cooling panel 111 manufacturing process may be increased.

A cooling flow path may further include a second cooling flow path 1112 connecting first cooling flow paths 1111 to each other. Referring to FIG. 6, a plurality of first cooling flow paths 1111 may be disposed in a preset interval. A second cooling flow path 1112 may connect one first cooling flow path 1111 and another first flow path 1111. A second cooling flow path 1112 may be curved.

Among a plurality of first cooling flow paths 1111, the first cooling flow path 1111 connected to an inlet flow path 122 and an outlet flow path 124 may be formed to be longer than another first cooling flow path 1111. As a result, a cooling panel 111 may be connected to an inlet flow path 122 and an outlet flow path 124. Referring to FIG. 6, among a plurality of first cooling flow paths 1111, a first cooling flow path 1111 positioned on the outermost side may be connected to one edge.

A cooling flow path may be formed in a 'U' shape or zigzag shape. Without being limited thereto, a cooling flow path may be provided in a pathway where a coolant is evenly distributed in one area of a cooling panel 111 so that the temperature of the cooling panel 111 may be uniform.

Figure 8:
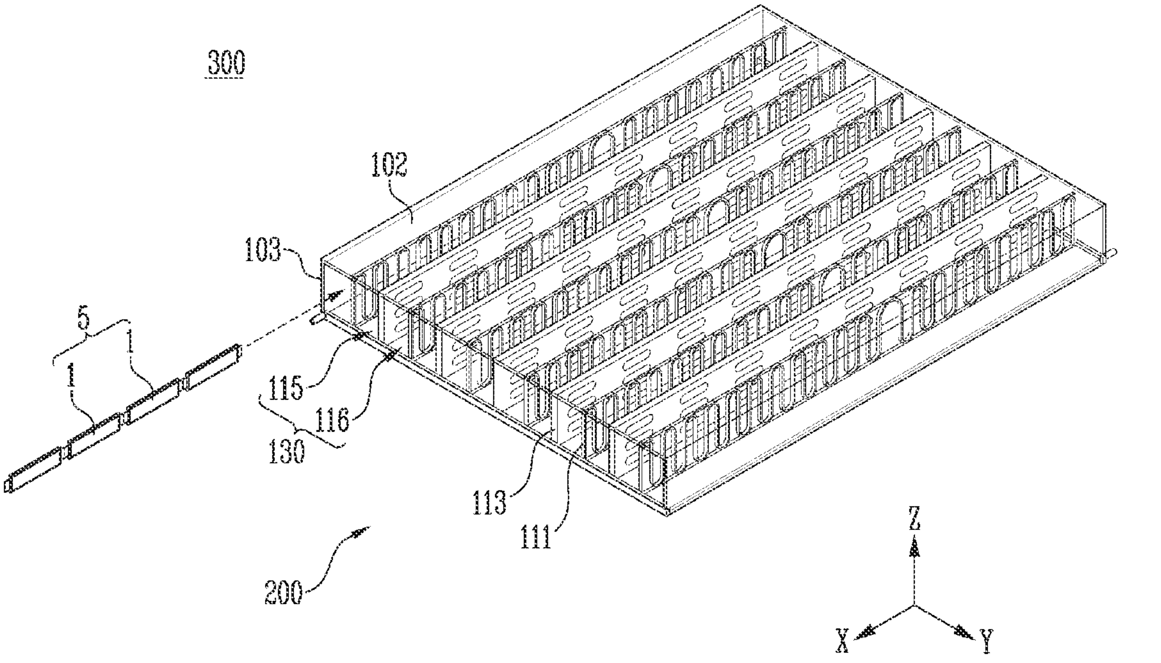
FIG. 8 shows a battery case and a battery assembly according to the present disclosure.

FIG. 8 shows a battery case and a battery assembly 1, 10 according to the present disclosure.

Referring to FIG. 8, a battery pack 300 according to the present disclosure includes: a plurality of battery assemblies 1, 10; a support panel 101 provided to support the plurality of battery assemblies 1, 10; a spacing panel 102 provided to face the support panel 101 and forming an accommodating space 130 to accommodate the plurality of battery assemblies 1, 10 between the support panel 101 and the spacing panel; a two-side panel 103 provided to face each other to connect the support panel 101 and the spacing panel 102 to form a side surface of the accommodating space 130; an opening portion formed by the support panel 101, the spacing panel 102, and the two-side panel 103; one or more blocking panels 113 disposed between the support panel 101 and the spacing panel 102 in parallel with the two-side panel 103 to compart the accommodating space 130; and one or more cooling panels 111 formed in the accommodating space 130 in parallel with the blocking panel 113 and cooling the plurality of battery assemblies 1, 10.

An opening portion 200 may be provided on one side of a battery pack 300. Alternatively, an opening portion 200 may be provided on the other side of a battery pack 300 so that both sides may be open. A battery pack 300 may further include a pack cover (not shown), and a pack cover may cover an opening portion 200. A pack cover may be connected to a support panel 101, a spacing panel 102, and a two-side panel 103 to prevent the plurality of battery assemblies 1, 10 from being separated from a battery pack 300. The opening portion 200 may be one side of an accommodating space 130.

A battery assembly 1, 10 may be inserted into an accommodating space 130 through an opening portion 200. Referring to FIG. 8, a battery assembly 1, 10 may be inserted into an accommodating space 130 along the X-direction. A plurality of battery assemblies 1, 10 may be provided and each may be inserted into an accommodating space 130 along the X-direction. A battery assembly 1, 10 may be inserted into an accommodating space 130 through the opening portion 200 to form a battery pack 300.

A plurality of battery assemblies 1, 10 may be grouped to form a plurality of battery stacks 5. Referring to FIG. 8, battery cells 1 may be grouped to form a battery stack 5. Any one of a plurality of battery stacks 5 may be formed by stacking along the direction in which battery assemblies 1, 10 are inserted through an opening portion 200.

A battery stack 5 may be formed by being grouped before being inserted into an accommodating space 130. After a battery stack 5 is formed, it may be inserted into an accommodating space 130. Without being limited thereto, any one battery assembly 1, 10 may be inserted through an opening portion 200 and another battery assembly 1, 10 may be stacked on the firstly inserted battery assembly 1, 10. At this time, a battery stack 5 may be formed inside an accommodating space 130.

The length of a blocking panel 113 along the direction in which a battery assembly 1, 10 is inserted may be equal to or longer than the length of a battery stack 5. Referring to FIG. 8, the length of a blocking panel 113 along the X-direction may be formed to be longer than the length of a battery stack 5. As a result, even when a fire occurs at a battery assembly 1, 10 included in a battery stack 5, propagation of the fire may be suppressed.

Any one battery stack 5 may be interposed between a cooling panel 111 and a cooling panel 111. Differently from the alternate arrangement of a cooling panel 111 and a blocking panel 113, a blocking panel 113 may be disposed, a cooling panel 111 may be disposed, and then a cooling panel 111 may be disposed again. Through this, a battery assembly 1, 10 can be efficiently cooled. In addition, a blocking panel 113 may be formed to be thick to suppress fire propagation. As such, the number of blocking panels 113 may be reduced and the number of cooling panels 111 may be increased to enhance space utilization. This can improve energy density of a battery pack 300.

The present disclosure may be modified and implemented in various forms, and its scope is not limited to the embodiments described above. Therefore, if a modified embodiment includes components of the present disclosure, it should be regarded as falling within the scope of the rights of the present disclosure.

What is claimed is:

1. A battery case comprising:

a support panel provided to support a battery assembly;

a spacing panel provided to face the support panel and forming an accommodating space for accommodating the battery assembly between the support panel and the spacing panel;

a two-side panel provided to face each other to connect the support panel and the spacing panel to form a side surface of the accommodating space;

blocking panels disposed between the support panel and the spacing panel in parallel with the two-side panel to compart the accommodating space, the blocking panels configured to minimize heat transfer;

cooling panels formed in the accommodating space in parallel with the blocking panels, the cooling panels are not in contact with the blocking panels and are configured to cool the battery assembly;

an inlet through which a coolant flows in from the outside, an outlet through which the coolant is discharged to the outside; and a circulation flow path connecting the inlet and the outlet to circulate the coolant in communication with the outside, wherein a thickness of the blocking panels is greater than the thickness of the cooling panels, and a length of the blocking panels is longer than a length of the support panel and is longer than a length of the spacing panel, wherein the battery assembly comprises a plurality of battery cells positioned between each of the blocking panels and each of the cooling panels, wherein the support panel fixes the battery assembly in the accommodating space so that wider surfaces of each of the battery cells face the cooling panels, wherein the number of cooling panels is greater than the number of blocking panels in one battery case, wherein each of the blocking panels and each of the cooling panels are alternately and repeatedly disposed between the two-side panel, wherein the circulation flow path comprises a zigzag-shaped cooling flow path included in one of the cooling panels, an inlet flow path connecting the inlet and the cooling flow path, and an outlet flow path connecting the outlet and the cooling flow path, wherein the cooling flow path comprises one or more first cooling flow paths and a second cooling flow path connecting the one or more first cooling flow paths to each other, and wherein the first cooling flow path directs the coolant from an edge of the cooling panel in contact with the support panel to an edge of the cooling panel in contact with the spacing panel or from an edge of the cooling panel in contact with the spacing panel to an edge of the cooling panel in contact with the support panel.

2. The battery case according to claim 1, wherein the blocking panels are positioned between two cooling panels that are closest to the two-side panel among the cooling panels.

3. The battery case according to claim 1, wherein the blocking panels and the cooling panels are disposed to be spaced apart from each other in a preset interval.

4. The battery case according to claim 1, wherein any one panel of the support panel or the spacing panel comprises the inlet and the inlet flow path on one side, and the outlet and the outlet flow path are provided on the other side of the any one panel.

5. The battery case according to claim 1, wherein one edge on one side of one of the blocking panels is connected to the support panel, and another edge on the other side of the one of the blocking panels is connected to the spacing panel.

6. The battery case according to claim 1, wherein the blocking panels have a thermal conductivity of 0.3 W/m*K or less.

7. A battery pack comprising:

a plurality of battery assemblies;

a support panel provided to support the plurality of battery assemblies;

a spacing panel provided to face the support panel and forming an accommodating space to accommodate the plurality of battery assemblies between the support panel and the spacing panel;

a two-side panel provided to face each other to connect the support panel and the spacing panel to form a side surface of the accommodating space;

an opening portion formed by the support panel, the spacing panel, and the two-side panel;

blocking panels disposed between the support panel and the spacing panel in parallel with the two-side panel to compart the accommodating space;

cooling panels formed in the accommodating space in parallel with the blocking panels, and the cooling panels are not in contact with the blocking panels and are configured to cool the battery assembly;

an inlet through which a coolant flows in from the outside, an outlet through which the coolant is discharged to the outside; and a circulation flow path connecting the inlet and the outlet to circulate the coolant in communication with the outside, wherein a battery assembly of the plurality of battery assemblies is disposed between one of the blocking panels and one of the cooling panels, and a length of the blocking panels is longer than a length of the support panel and is longer than a length of the spacing panel, wherein the battery assembly comprises a plurality of battery cells, wherein the support panel fixes the battery assembly in the accommodating space so that wider surfaces of each of the battery cells face the cooling panels, wherein the number of cooling panels is greater than the number of blocking panels in one battery case, wherein each of the blocking panels, and each of the cooling panels are alternately and repeatedly disposed between the two-side panel, wherein the circulation flow path comprises a zigzag-shaped cooling flow path included in one of the cooling panels, an inlet flow path connecting the inlet and the cooling flow path, and an outlet flow path connecting the outlet and the cooling flow path, wherein the cooling flow path comprises one or more first cooling flow paths and a second cooling flow path connecting the one or more first cooling flow paths to each other, and wherein the first cooling flow path directs the coolant from an edge of the cooling panel in contact with the support panel to an edge of the cooling panel in contact with the spacing panel or from an edge of the cooling panel in contact with the spacing panel to an edge of the cooling panel in contact with the support panel.

8. The battery pack according to claim 7, wherein the plurality of battery assemblies are inserted into the accommodating space through the opening portion.

9. The battery pack according to claim 8, wherein the plurality of battery assemblies are grouped to form a plurality of battery stacks, and any one of the plurality of battery stacks is formed by stacking along a direction in which the plurality of battery assemblies are inserted through the opening portion.

10. The battery pack according to claim 9, wherein the length of the blocking panels along the direction in which the plurality of battery assemblies are inserted is equal to or longer than the length of the plurality of battery stacks.

* * * * *